(12) United States Patent
Seo et al.

(10) Patent No.: US 9,426,204 B2
(45) Date of Patent: Aug. 23, 2016

(54) NETWORK CONNECTION SYSTEM FOR SHARING DATA AMONG INDEPENDENT NETWORKS

(75) Inventors: Kwang Sik Seo, Daejeon (KR); Jun Yeop Kim, Daejeon (KR); Byong Hoon Chong, Daejeon (KR); Jin Ung Kim, Gyeonggi-do (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 359 days.

(21) Appl. No.: 13/824,795

(22) PCT Filed: Apr. 19, 2012

(86) PCT No.: PCT/KR2012/002973
§ 371 (c)(1),
(2), (4) Date: Mar. 18, 2013

(87) PCT Pub. No.: WO2012/144806
PCT Pub. Date: Oct. 26, 2012

(65) Prior Publication Data
US 2013/0173732 A1 Jul. 4, 2013

(30) Foreign Application Priority Data
Apr. 22, 2011 (KR) .................. 10-2011-0037926

(51) Int. Cl.
*G06F 15/16* (2006.01)
*H04L 29/08* (2006.01)
*G06F 15/167* (2006.01)
*H04L 12/58* (2006.01)

(52) U.S. Cl.
CPC .............. *H04L 67/06* (2013.01); *G06F 15/167* (2013.01); *H04L 51/066* (2013.01); *H04L 67/1097* (2013.01)

(58) Field of Classification Search
None
See application file for complete search history.

(56) References Cited

U.S. PATENT DOCUMENTS 8,185,581 B2 * 5/2012 Duggal .................. G06Q 10/10
709/202
2003/0182501 A1 * 9/2003 George et al. ................. 711/114
(Continued)

FOREIGN PATENT DOCUMENTS

KR 10-0740682 B1 7/2007
KR 10-0785361 B1 12/2007
(Continued)

OTHER PUBLICATIONS

Practially Networked, "Windows XP Simple File Sharing", Jun. 10, 2004.*

*Primary Examiner* — Ryan Jakovac
(74) *Attorney, Agent, or Firm* — Rabin & Berdo, P.C.

(57) ABSTRACT

A network connection system for sharing data among networks using a shared storage to enable easy mail transception, file transception, and use of clipboards, including a first terminal connected to a first network; a first network connection server between a shared storage and the first terminal to control or transceive data; a second terminal connected to a second network; a second network connection server between the shared storage and the second terminal to control or transceive data; having a single storage space shared by the network connection servers. Using separate portable storage media is eliminated, and a clipboard may be used. In addition, mail may be converted and transceived among the networks to reduce security risks, and files may be transceived among networks even when multiple terminals are accessed, eliminating loads on a server and improving quality of shared storage.

6 Claims, 7 Drawing Sheets

(56) References Cited

U.S. PATENT DOCUMENTS

2007/0079249 A1* 4/2007 Pall et al. ................. 715/758
2009/0193207 A1* 7/2009 Ogata et al. .............. 711/162
2011/0242573 A1* 10/2011 Takahara .................. 358/1.13

FOREIGN PATENT DOCUMENTS

KR 10-2011-0037492 A 4/2011
WO WO 02067529 A2 * 8/2002 ............ G06F 11/201

* cited by examiner

NETWORK CONNECTION SYSTEM FOR SHARING DATA AMONG INDEPENDENT NETWORKS

TECHNICAL FIELD

The present invention relates, in general, to a network connection system for sharing data among independent networks and, more particularly, to a network connection system for sharing data among independent networks, which shares data using shared storage in an environment in which networks are independent, thus facilitating the sending/receiving of mails, the sending/receiving of files, and the use of clipboards among the networks.

BACKGROUND ART

Networks may be independently present, and such independent networks may be multiple networks, such as a first network, a second network, and a third network.

However, in a state in which first and second networks are independent, the sending/receiving of mails between both the networks is impossible, and contents and files corresponding to mails created in the first network must be moved to the second network through a separate storage medium, and must be used to perform a task. In particular, when the contents of a mail created in the first network are linked to a third network, it is impossible to utilize or read the mail in the second network. Further, when it is desired to read a mail, created in the second network, in the first network, there is inconvenience in that the mail must be moved from the second network to the first network through a separate portable storage medium before it can be read.

Further, there is inconvenience in that when it is desired to download data from the first network and utilize the data in the second network, the data must be moved to the second network through a separate portable storage medium.

Meanwhile, there is inconvenience in that images and text of the first network must be stored in the form of a file using a separate screen capture system and must be moved to and utilized in the second network through a separate portable storage medium.

In this way, in the environment in which networks are independent, the transfer of data between both networks must be performed using a separate portable storage medium, management procedures, such as for carrying-in/carrying-out of the storage medium and regulation of the use of an unauthorized storage medium, must be involved, and the performance of storage and transfer of data is completely dependent on the determination of a user, thus causing a possibility that data may be leaked due to the carelessness of the user. Further, a problem arises in that due to abrasion and damage to a storage medium caused by long-term use of the storage medium, important task data may be lost.

Furthermore, in an environment in which networks are independent, screen capturing, keylogging, etc. are blocked and a drag & drop operation, a copy & paste operation, etc. for data are prevented between both independent networks, thus causing inconvenience in use.

DISCLOSURE

Technical Problem

Accordingly, the present invention has been made keeping in mind the above problems, and an object of the present invention is to provide a network connection system for sharing data among independent networks, which shares data using shared storage in an environment in which networks are independent, thus overcoming inconvenience caused by the use of a portable storage medium and facilitating the sending/receiving of mails, the sending/receiving of files, and the use of clipboards between both independent networks.

Technical Solution

A network connection system for sharing data among independent networks according to the present invention to accomplish the above object includes a first terminal connected to a first network and used by the first network, a first network connection server disposed between shared storage and the first terminal and configured to control or transmit/receive data, a second terminal connected to a second network and used by the second network, a second network connection server disposed between the shared storage and the second terminal and configured to control or transmit/receive data, and the shared storage configured to allow a single storage space to be shared between the first network connection server and the second network connection server.

In this case, the shared storage may include two volumes having different rights of reading and writing for the first network connection server and for the second network connection server.

Further, the network connection system may further include a first network mail server for converting each mail received by the first terminal into an eml file (a), and sending the eml file (a) to the first network connection server, and a second network mail server for converting each mail to be sent by the second terminal into an eml file (b), storing the eml file (b), and sending the eml file (b) to the second network connection server.

Furthermore, the first network mail server may send only a previously designated mail among received mails to the first network connection server.

Furthermore, the first network connection server may send the eml file (a) to the second network connection server, and the second network connection server may send the eml file (a) to the second network mail server using a Simple Mail Transfer Protocol (SMTP).

Furthermore, the first network mail server converts a rendered image of the eml file (a) into a Portable Document Format (PDF) file, attach the PDF file to the eml file (a), and send the eml file (a) with the PDF file attached thereto to the first network connection server.

Furthermore, the second network connection server may send the eml file (b) to the first network connection server, and the first network connection server may send the eml file (b) to the first network mail server using an SMTP.

Furthermore, the second network mail server may convert a rendered image of the eml file (b) into a Portable Document Format (PDF) file, attach the PDF file to the eml file (b), and send the eml file (b) with the PDF file attached thereto to the second network connection server.

Furthermore, the second network connection server may further include an approval unit for automatically or manually obtaining approval with reference to an approver database (DB) when transmitting/receiving data.

Furthermore, the second terminal may be connected to the first terminal in a form of a network drive and is configured to output folders and file contents of the first terminal in an environment of a Graphical User Interface (GUI), the first terminal can be connected to the second terminal in a form of a network drive and is configured to output folders and file contents of the second terminal in an environment of a GUI, and an interface capable of dragging or coping and transferring files between the first terminal and the first terminal using a mouse is provided.

Furthermore, the second network connection server or the first network connection server may be configured such that when at least one file is transferred between the second terminal and the first terminal, the file is divided into preset units, and the divided units are combined to regenerate a preset file, and then the preset file is sent to the shared storage. In this case, an operation of regenerating the file may be performed at preset time intervals, and a queue may be used when sending the regenerated file.

Furthermore, transmission/reception of data between the second network connection server and the shared storage or between the shared storage and the first network connection server may be performed using a dedicated transfer protocol.

Furthermore, the second network connection server and the first network connection server may generate or manage a clipboard to be shared therebetween using the shared storage. If copying from the second terminal or the first terminal to the clipboard is performed using any copy shortcut key, pasting from the clipboard into the first terminal or the second terminal may be performed using any paste shortcut key. In this case, contents of the clipboard may be present only in a volume of the shared storage on which copying is performed.

Advantageous Effects

In accordance with a network connection system for sharing data among independent networks according to the present invention:

First, there is no need to use a separate portable storage medium to share data among independent networks, thus increasing convenience.

Second, mails are automatically converted and transferred upon sending/receiving mails among independent networks, thus removing a security threat.

Third, when files are transferred among independent networks, efficient processing can be performed even if a plurality of terminals simultaneously access each network and transfer files, thus removing a load on a server and improving the quality of shared storage.

Fourth, since a clipboard may be used among independent networks, there is no need to perform unnecessary operations.

BEST MODE

Figure 1:
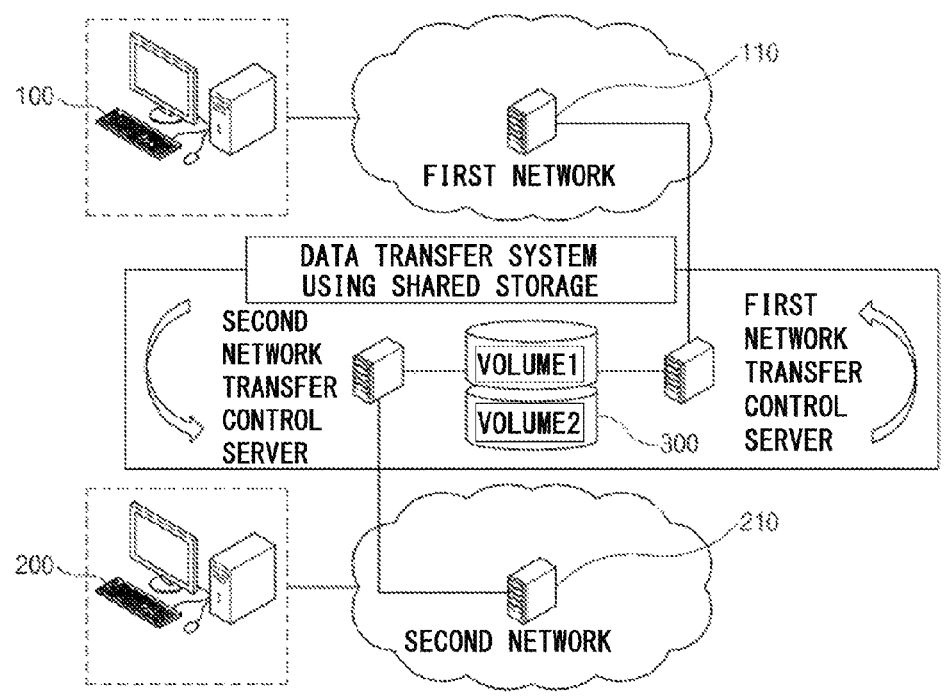
FIG. 1 is a diagram showing the configuration of a network connection system for sharing data among independent networks according to the present invention.

Hereinafter, preferred embodiments of the present invention will be described in detail with reference to the attached drawings. Prior to giving the description, the terms and words used in the present specification and claims should not be interpreted as being limited to their typical meaning based on the dictionary definitions thereof, but should be interpreted as having the meaning and concept relevant to the technical spirit of the present invention, on the basis of the principle by which the inventor can suitably define the implications of terms in the way which best describes the invention.

Accordingly, the embodiments described in the present specification and constructions shown in the drawings are only the most preferable embodiments of the present invention, and are not representative of the entire technical spirit of the present invention, and so it should be understood that various equivalents and modifications capable of replacing the embodiments and constructions of the present invention might be present at the time at which the present invention was filed.

The present invention relates, in general, to a network connection system for sharing data among independent networks and, more particularly, to a network connection system for sharing data among independent networks, which shares data using shared storage in an environment in which networks are independent, thus facilitating the sending/receiving of mails, the sending/receiving of files, and the use of clipboards among the networks.

In the present invention, a first network and a second network denote separate independent networks, and any networks may be sufficiently used as long as they are independent without being limited to specific networks.

FIG. 1 is a diagram showing the configuration of a network connection system for sharing data among independent networks according to the present invention. The network connection system for sharing data among independent networks includes a first terminal 100 connected to a first network and used by the first network, a first network connection server 110 disposed between shared storage 300 and the first terminal 100 and configured to control or transmit/receive data, a second terminal 200 connected to a second network and used by the second network, a second network connection server 210 disposed between the shared storage 300 and the second terminal 200 and configured to control or transmit/receive data, and the shared storage 300 configured to allow a single storage space to be shared between the first network connection server 110 and the second network connection server 210.

Figure 2:
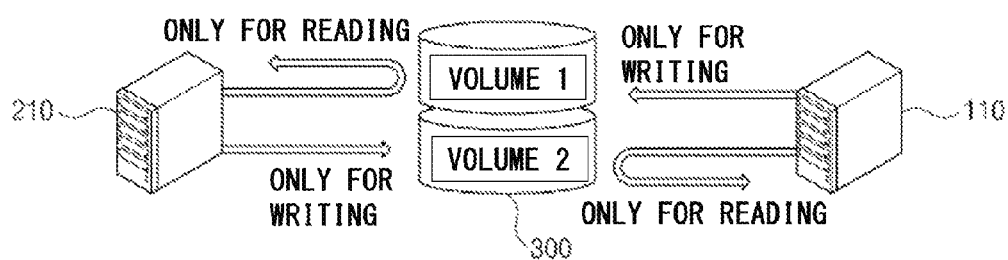
FIG. 2 is a diagram showing an embodiment in which data is transferred using shared storage.

FIG. 2 is a diagram showing an embodiment in which data is transferred using shared storage. As shown in FIG. 2, the shared storage 300 supports a function of allowing a single storage space to be shared among a plurality of servers, and may be composed of at least two volumes having different rights of reading and writing for the first network connection server 110 and for the second network connection server 210. In this way, the rights of reading and writing from/to the storage space of the shared storage 300 are controlled, thus providing the effect of guaranteeing unidirectionality and inter-network independence. In addition, a malicious code checking function performed upon inputting data into the shared storage and a function of determining whether the corresponding file is an authorized file upon reading data from the shared storage may also be added.

Figure 3:
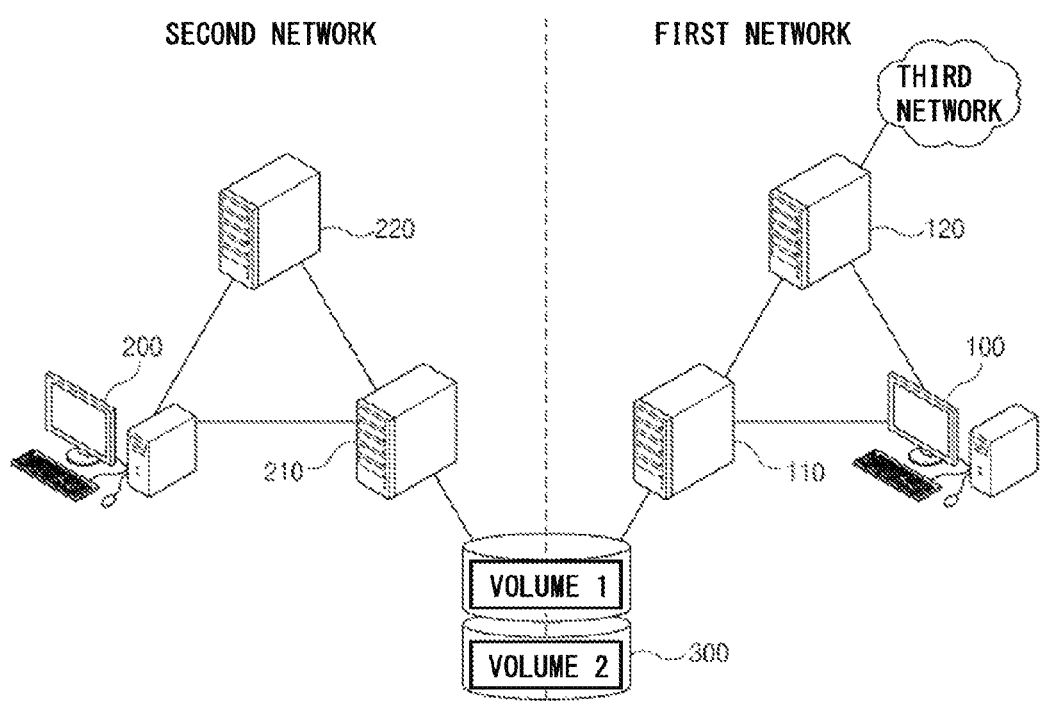
FIG. 3 is a diagram showing the configuration of a network connection system for sharing data among independent networks to which a mail sending/receiving function is added according to the present invention.

FIG. 3 is a diagram showing the configuration of a network connection system for sharing data among independent networks to which a mail sending/receiving function is added according to the present invention. The network connection system for sharing data among independent networks according to the present invention may further include a first network mail server 120 which converts each mail received by the first terminal 100 into an eml file (a) and sends the eml file (a) to the first network connection server 110, and a second network mail server 220 which converts each mail sent by the second terminal 200 into an eml file (b), stores the eml file (b), and sends it to the second network connection server 210.

Figure 4:
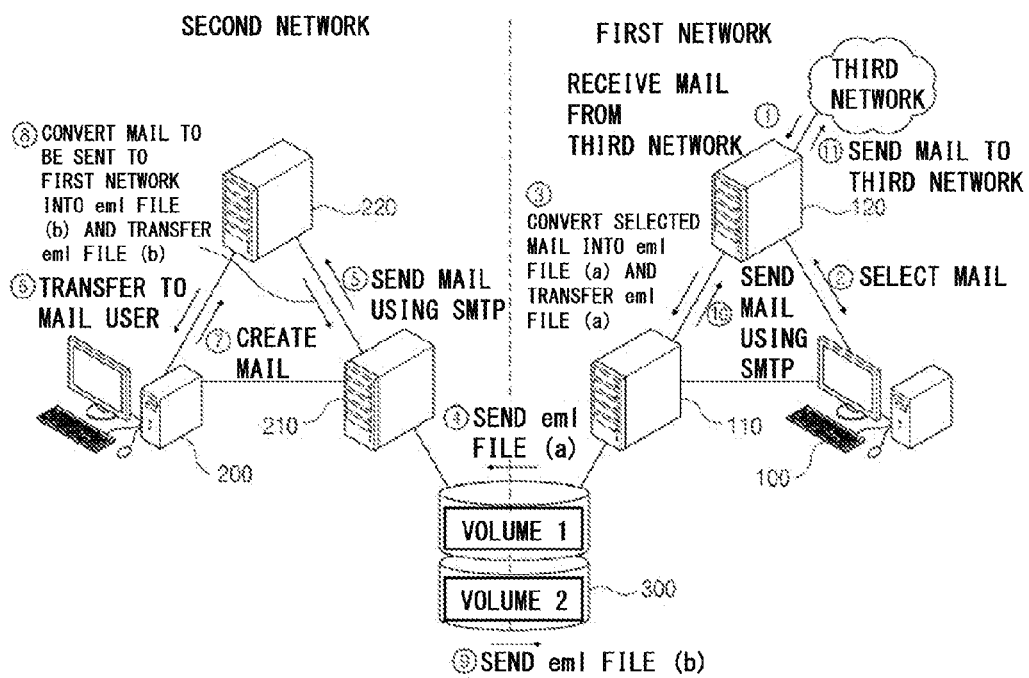
FIG. 4 is a diagram showing an embodiment in which a mail is sent/received in the network connection system for sharing data among independent networks according to the present invention.

FIG. 4 is a diagram showing an embodiment in which a mail is sent/received in the network connection system for sharing data among independent networks according to the present invention. A mail sending/receiving process between a second network and a first network will be described in detail with reference to FIG. 4.

A first procedure is the procedure of transferring a mail created in a third network from the first network to the second network. When the first network mail server 120 receives a mail from the third network (①), the first terminal 100 previously designates or selects the mail so that the mail is sent to the second network (②). Accordingly, the first network mail server 120 sends only a designated mail among received mails to the first network connection server 110, wherein the received mail is converted into an eml file (a) and is then sent (③). The first network connection server 110 sends the eml file (a) to the second network connection server 210 using the shared storage 300 (④), and the second network connection server 210 sends the eml file (a) to the second network mail server 220 using a Simple Mail Transfer Protocol (SMTP) (⑤), and the sent mail is transferred to the second terminal 200 and is then sent to a user (⑥). Of course, this procedure also includes a procedure in which the user transfers a mail from the first network to the second network, in addition to the procedure in which a mail is received from the first network and sent to the second network.

In this case, the first network mail server 120 may convert a rendered image of the eml file (a) into a Portable Document Format (PDF) file, attach the PDF file to the eml file (a), and send the eml file (a) with the PDF file attached thereto to the first network connection server 110. In the case of an eml file, there are some cases where a link to another network is included in the eml file or where image files are attached to the eml file, and so there are many cases where if networks are different from each other, the eml file may be corrupted or, alternatively, all of the contents thereof may not be displayed. Therefore, in order to solve such a problem, a rendered image of the eml file (a) is converted into a PDF file and the PDF file is attached to the eml file (a), and thus full text of the file may be viewed by solving the problem of the file being corrupted or not being linked. Rendering denotes a computer graphics term indicating the process of inspiring reality while taking into consideration external information, such as a light source, a location, and color, and a rendered image denotes an image on which rendering has been processed. In a case where an image file is not attached, only text needs to be converted into a PDF file, but when an image such as a picture, in addition to text, is included in a file, it is preferable to go through a rendering process and convert the file into a PDF file so as to realistically display the file. Although, in the above embodiment, the first network mail server 120 has converted the file into a PDF file, it is also possible to provide a separate PDF conversion server and perform conversion. When the PDF conversion server is separately provided, the PDF conversion server may convert an eml file (a) into a PDF file before the first network connection server 110 sends a mail to be transferred to another network to the shared storage 300, and may attach the PDF file to the eml file (a) and send the eml file (a) with the PDF file attached thereto to the shared storage 300. In addition, all design-modifiable ranges are included in the present process.

Next, the next procedure is a procedure in which a mail is created in the second network and is transferred to the first network. When the second terminal 200 creates and sends a mail (⑦), it is determined whether the corresponding mail is a mail for the second network or for the first network. As a result of the determination, if the corresponding mail is a mail to be sent to the first network, the second network connection server 210 converts the mail to be sent into an eml file (b) (⑧), and sends the eml file (b) to the first network connection server 110 using the shared storage 300 (⑨). The first network connection server 110 transfers the eml file (b) to the first network mail server 120 using SMTP (⑩), and the first network mail server 120 sends the mail to the first network (⑪).

Even in this case, the second network mail server 220 may convert a rendered image of the eml file (b) into a PDF file, attach the PDF file to the eml file (b), and send the eml file (b) with the PDF file attached thereto to the second network connection server 210. This operation is identical to that of the above description.

Further, an eml file is a file that can be read from Windows Mail and Outlook Express and may be an msg file or the like which may be opened and read from Office Outlook without being necessarily limited to the format of an eml file.

Meanwhile, the second network connection server 210 of the network connection system for sharing data among independent networks according to the present invention may further include an approval unit (not shown). That is, when data is transmitted/received, approval is manually or automatically obtained with reference to an approver database (DB), wherein there are many cases where the transmission/reception of data including mails to another network requires approval. Therefore, the approval unit stores a list of approvers, whose approvals are required for respective data types, in the approver DB, and obtains approval upon transmitting/receiving data. However, manual approval may be set so that whenever data is transmitted/received, approval is obtained online or offline, but if automatic approval is checked in the case of repetitive operations, the corresponding data may be treated as being approved.

Figure 5:
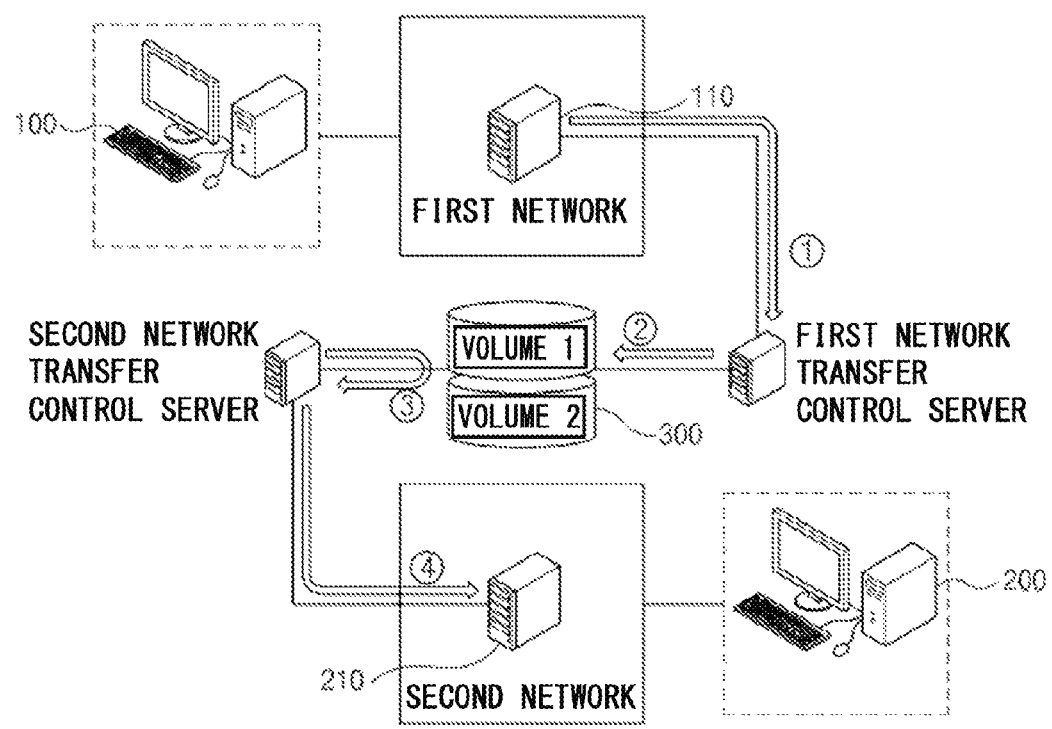
FIG. 5 is a diagram showing a flow in which data is transferred from a first network to a second network according to the present invention.

FIG. 5 is a diagram showing a flow in which data is transferred from a first network to a second network according to the present invention. As shown in FIG. 5, when data is transferred from the first network to the second network, the first terminal 100 transfers the data to the first network connection server 110, and the first network connection server 110 transfers the data to a first network transfer control server (①). When the data is written in the shared storage 300 through the first network transfer control server (②), a second network transfer control server reads the data from the shared storage 300 (③), and sends it to the second network connection server 210 (④), and the second network connection server 210 sends the data to the second terminal 200.

Figure 6:
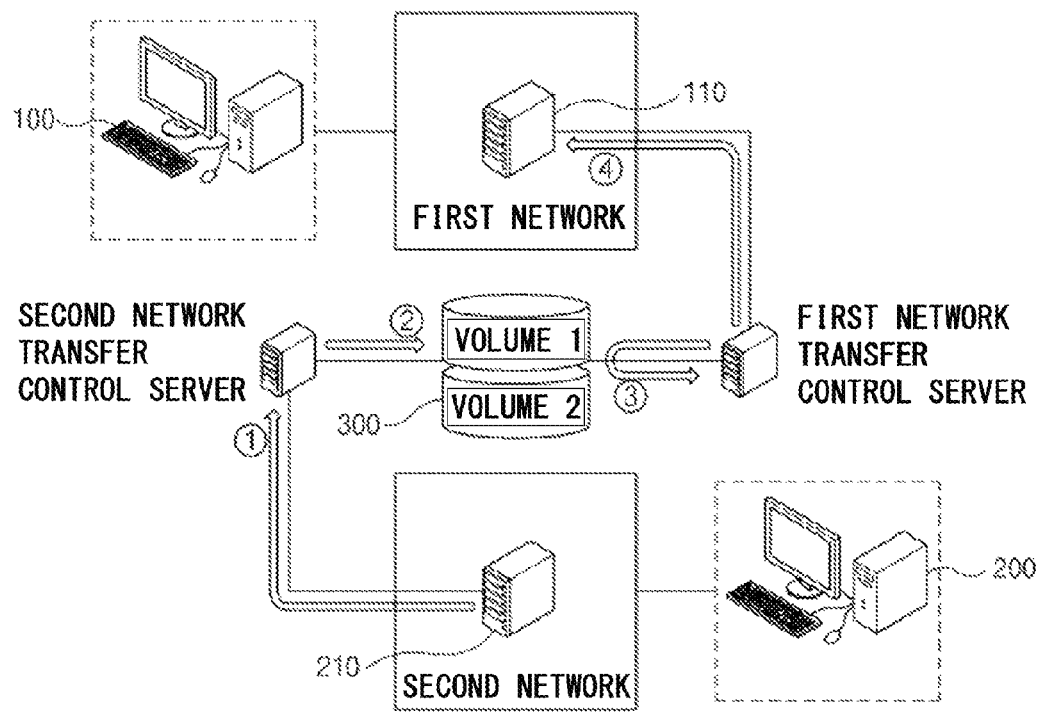
FIG. 6 is a diagram showing a flow in which data is transferred from a second network to a first network according to the present invention.

FIG. 6 is a diagram showing a flow in which data is transferred from a second network to a first network according to the present invention. As shown in FIG. 6, when data is transferred from the second network to the first network, the second terminal 200 sends the data to the second network connection server 210, and the second network connection server 210 sends the data to the second network transfer control server (①). When the data is written in the shared storage 300 through the second network transfer control server (②), the first network transfer control server reads the data from the shared storage 300 (③) and sends the data to the first network connection server 110 (④), and the first network connection server 110 sends it to the first terminal 100.

However, when data is transferred between the second network and the first network in this way, the first terminal 100 may be connected to the second terminal 200 in the form of a network drive. The folders and file contents of the second terminal 200 are output in the environment of a Graphical User Interface (GUI), so that an interface is provided which allows the file to be dragged or copied from the first terminal 100 using a mouse and to be transferred to the second terminal 200. This procedure is equally performed even when a file is transferred from the second terminal 200 to the first terminal 100. That is, even the second terminal 200 may be connected to the first terminal 100 in the form of a network drive, and provides an interface which allows a desired file to be dragged or copied and transferred using a mouse.

Of course, due to such an interface, the user may recognize that the file is directly transferred from the second terminal 200 to the first terminal 100 or from the first terminal 100 to the second terminal 200, but the transfer of files follows the procedures of FIGS. 5 and 6.

However, there is a problem in that when a plurality of second terminals 200 attempt to simultaneously send files upon transferring data, the number of users who simultaneously access the network increases, thus causing a load on the second network connection server 210 and deteriorating the quality of the shared storage 300. Therefore, when the second terminal 200 sends at least one file, the second network connection server 210 divides the file into preset units, combines the divided file units to regenerate a preset file, and sends the preset file to the shared storage 300, thus solving the above problem.

In this way, the operation of regenerating the file is performed at preset time intervals, and regenerated files are sequentially sent using a queue, and so the load of the second network connection server 210 may be prevented from occurring, and the quality of the shared storage 300 may be improved.

That is, when a plurality of second terminals 200 simultaneously send a plurality of files, each file is divided into units of a uniform size, and the divided file units are combined to regenerate a new file, and thus the regenerated file is obtained by combining the divided units of the plurality of files.

Even in the case where the first network connection server 110 sends data to the second terminal 200, the data is sent through the same procedure. Further, when files are received, an operation of restoring the regenerated file to original files must be performed. It is preferable to perform such a restoration operation through the second network transfer control server and the first network transfer control server. However, it is apparent that transfer control servers are not separately provided and such a restoration operation may also be performed through the first network connection server 110 and the second network connection server 210.

Meanwhile, as described above, when data is transmitted/received between the first network and the second network, data goes through the shared storage 300. That is, different networks are connected to each other through the shared storage 300. Therefore, the transmission/reception of data between the second and first network connection servers 210 and 110 and the shared storage 300 is preferably performed using a dedicated transfer protocol. The dedicated transfer protocol is required to be distinguished from protocols used in the first network or the second network. Unless the dedicated transfer protocol is identical to the protocols used in the first network or the second network, it is not limited to a specific type.

Meanwhile, the second network connection server 210 and the first network connection server 110 may create or manage a clipboard to be shared therebetween using the shared storage 300. Such a clipboard denotes a software program used when corresponding data is temporarily stored for a short period of time when the data is transferred between documents or application programs using a cut & paste procedure, wherein such a clipboard is not supported by independent networks, such as the first network and the second network. Accordingly, the present invention supports a clipboard between the first network and the second network by storing the contents of the clipboard in the shared storage 300.

Figure 7:
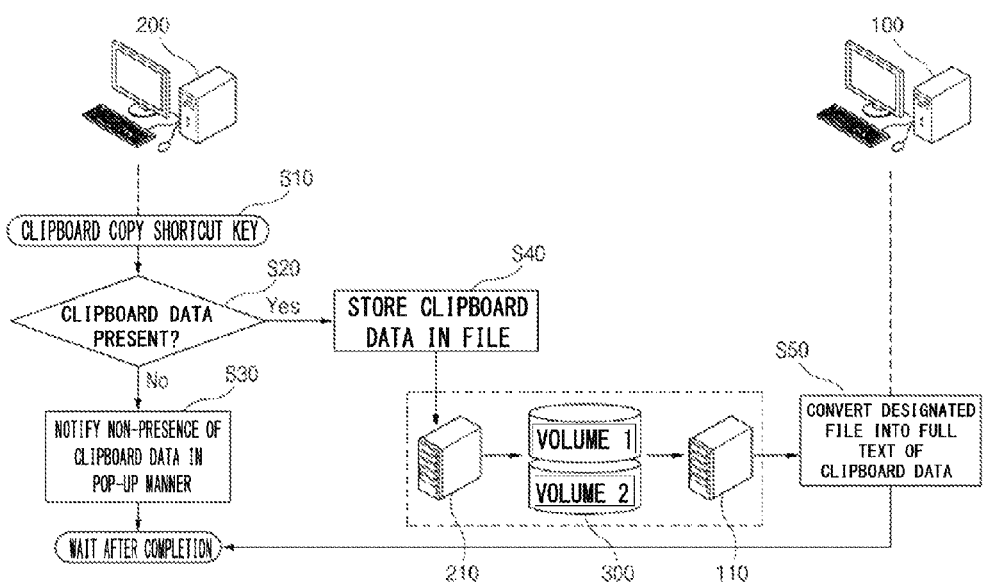
FIG. 7 is a diagram showing an embodiment in which copying to a clipboard is performed using any copy shortcut key according to the present invention.

For example, when copying from the second terminal 200 to the clipboard is performed using any copy shortcut key (for example, ctrl+C), the contents of the clipboard may be pasted into the first terminal 100 using any paste shortcut key (for example, ctrl+V). FIG. 7 is a diagram showing an embodiment in which copying to a clipboard is performed using any copy shortcut key according to the present invention, wherein the embodiment of copying to the clipboard will be described in detail below.

First, when data is copied from the second terminal 200 to a clipboard using any copy shortcut key (S10), the clipboard agent of the second terminal 200 determines whether data is present in the clipboard by checking the clipboard (S20). If it is determined that no data is present in the clipboard, notification indicating that clipboard data is not present is provided in a pop-up manner (S30), and such separate notification may not be necessarily provided. Further, if any data is present in the clipboard, the clipboard agent stores the clipboard data in the form of a file (S40), and sends the file to the second network connection server 210. The sent file is transferred to the first network connection server 110 through the shared storage 300, and the clipboard agent of the first terminal 100 converts the stored file into full text of the clipboard data (S50), and stores the full text of the clipboard data in the system clipboard of the first terminal 100. Therefore, when it is desired to paste the copied clipboard data on the first terminal 100, the pasting of the clipboard data may be performed.

Figure 8:
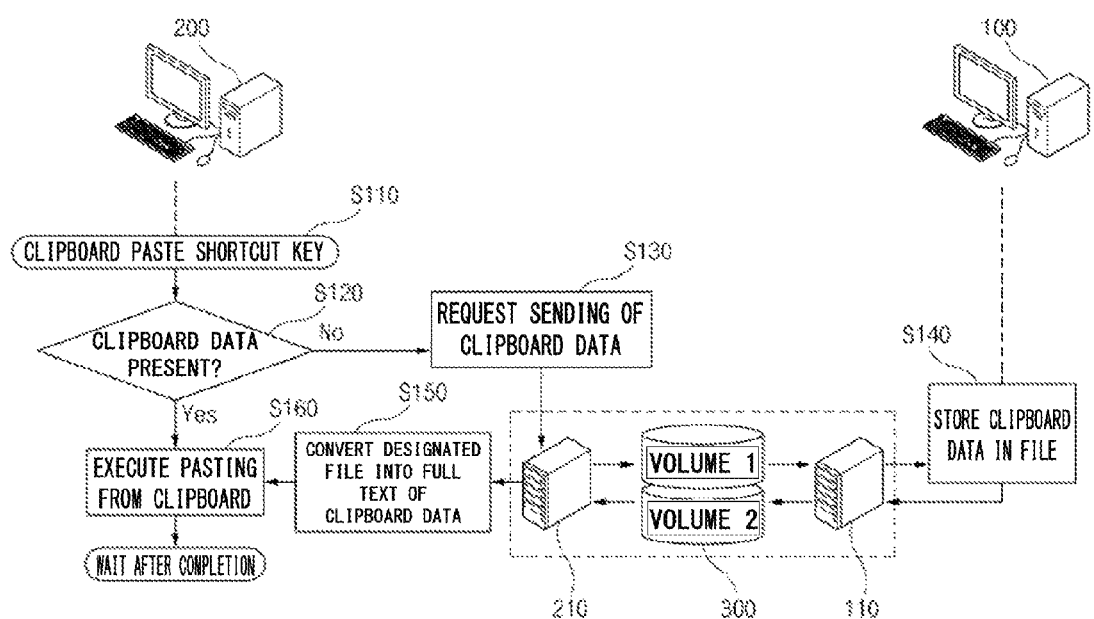
FIG. 8 is a diagram showing an embodiment in which pasting from a clipboard is performed using any paste shortcut key according to the present invention.

FIG. 8 is a diagram showing an embodiment in which pasting from a clipboard is performed using any paste shortcut key according to the present invention, wherein an embodiment of pasting from the clipboard will be described in detail below.

First, when any paste shortcut key is executed on the second terminal 200 (S110), the clipboard agent of the second terminal 200 determines whether data is present in the clipboard by checking the system clipboard thereof (S120). As shown in FIG. 7, there may occur a case where data to be pasted is previously stored using a copy shortcut key, but if no data is present in the clipboard, the clipboard agent of the second terminal 200 sends a clipboard transfer request (S130) to the second network connection server 210. This request is sent to the first network connection server 110 through the shared storage 300, and the clipboard agent of the first terminal 200 that received the request stores the clipboard data in the form of a file with reference to the system clipboard of the first terminal 200 (S140), and resends the file to the first network connection server 110. Of course, in this case, if no clipboard data is present in the system clipboard of the first terminal 100, no operation is performed. The clipboard data file sent to the second network connection server 210 through the shared storage 300 is converted into full text of the clipboard data through the clipboard agent of the second terminal 200 (S150), and pasting from the clipboard is performed (S160).

In the above embodiment, although a description has been made based on the second terminal 200, this is equally applied to a case where a clipboard is used by the first terminal 100 with respect to the second terminal 200. However, even in this case, it is preferable to prevent security from being threatened due to the clipboard by causing the contents of the clipboard to be present only in the volume of the shared storage 300 on which copying is performed.

Meanwhile, although the present invention has been described with reference to embodiments in the environment in which networks are physically independent using two terminals, it is apparent that the present invention may also be used in an environment in which networks are logically independent, as well as an environment in which networks are physically independent using other methods. That is, when networks are physically or logically independent, a device or a module functioning to interface with the first network only needs to perform the functions of the first terminal, the first network connection server, and the first network mail server according to the present invention, and a device or a module functioning to interface with the second network only needs to perform the functions of the second terminal, the second network connection server, and the second network mail server according to the present invention.

Further, a plurality of independent networks, such as a first network and a second network, may be present, and the sharing of data among the plurality of independent networks may also be applied in the same manner.

Although the present invention has been described with reference to a limited number of embodiments and drawings, the present invention is not limited by those embodiments and drawings, and it is apparent that various changes and modifications may be implemented by those skilled in the art, within the technical spirit of the present invention and the equivalent ranges of the accompanying claims.

The invention claimed is:

1. A network connection system for sharing data among independent networks, comprising:
   a first terminal connected to a first network and used by the first network;
   a first network connection server disposed between shared storage and the first terminal and configured to control or transmit/receive data;
   a second terminal connected to a second network and used by the second network;
   a second network connection server disposed between the shared storage and the second terminal and configured to control or transmit/receive data;
   a first network mail server for converting each mail received by the first terminal into an eml file (a), and sending the eml file (a) to the first network connection server; and
   a second network mail server for converting each mail to be sent by the second terminal into an eml file (b), storing the eml file (b), and sending the eml file (b) to the second network connection server,
   the shared storage configured to allow a single storage space to be shared between the first network connection server and the second network connection server.

2. The network connection system of claim 1, wherein the first network mail server sends only a previously designated mail among received mails to the first network connection server.

3. The network connection system of claim 2, wherein:
   the first network connection server sends the eml file (a) to the second network connection server, and
   the second network connection server sends the eml file (a) to the second network mail server using a Simple Mail Transfer Protocol (SMTP).

4. The network connection system of claim 3, wherein the first network mail server
   converts a rendered image of the eml file (a) into a Portable Document Format (PDF) file,
   attaches the PDF file to the eml file (a), and
   sends the eml file (a) with the PDF file attached thereto to the first network connection server.

5. A network connection system for sharing data among independent networks, comprising:
   a first terminal connected to a first network and used by the first network;
   a first network connection server disposed between shared storage and the first terminal and configured to control or transmit/receive data;
   a second terminal connected to a second network and used by the second network;
   a second network connection server disposed between the shared storage and the second terminal and configured to control or transmit/receive data;
   wherein:
   the second network connection server sends the eml file (b) to the first network connection server,
   the first network connection server sends the eml file (b) to the first network mail server using SMTP, and
   the shared storage is configured to allow a single storage space to be shared between the first network connection server and the second network connection server.

6. The network connection system of claim 5, wherein the second network mail server
   converts a rendered image of the eml file (b) into a Portable Document Format (PDF) file,
   attaches the PDF file to the eml file (b), and
   sends the eml file (b) with the PDF file attached thereto to the second network connection server.

\* \* \* \* \*